United States Patent
Yoshioka

(10) Patent No.: US 9,181,833 B2
(45) Date of Patent: Nov. 10, 2015

(54) ELECTRICALLY HEATED CATALYST

(75) Inventor: Mamoru Yoshioka, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/345,502

(22) PCT Filed: Oct. 18, 2011

(86) PCT No.: PCT/JP2011/073936
§ 371 (c)(1),
(2), (4) Date: Mar. 18, 2014

(87) PCT Pub. No.: WO2013/057792
PCT Pub. Date: Apr. 25, 2013

(65) Prior Publication Data
US 2014/0216019 A1    Aug. 7, 2014

(51) Int. Cl.
*B01D 50/00* (2006.01)
*F01N 3/20* (2006.01)
*F01N 13/14* (2010.01)
*F01N 3/28* (2006.01)

(52) U.S. Cl.
CPC ............ *F01N 3/2013* (2013.01); *F01N 3/2026* (2013.01); *F01N 3/2864* (2013.01); *F01N 3/2892* (2013.01); *F01N 13/14* (2013.01); *F01N 13/148* (2013.01); *Y02T 10/26* (2013.01)

(58) Field of Classification Search
CPC ... F01N 3/2026; F01N 13/148; F01N 3/2893; Y02T 10/26
USPC .......................................... 422/174, 177, 180
See application file for complete search history.

(56) References Cited

U.S. PATENT DOCUMENTS 5,070,694 A * 12/1991 Whittenberger ................ 60/300
2013/0164185 A1    6/2013 Yoshioka et al.

FOREIGN PATENT DOCUMENTS

| EP | 2685061 A1 | 1/2014 |
|---|---|---|
| GB | 2425073 A * | 10/2006 |
| JP | 08-232647 | 9/1996 |
| JP | 11-002117 | 1/1999 |
| JP | 2004-239107 A | 8/2004 |
| JP | 2005-127257 A | 5/2005 |
| WO | 2012/032650 A1 | 3/2013 |

* cited by examiner

*Primary Examiner* — Tom P Duong
(74) *Attorney, Agent, or Firm* — Kenyon & Kenyon LLP

(57) ABSTRACT

Electricity is suppressed from flowing to a case of an electrically heated catalyst. In the electrically heated catalyst which is provided with a heat generation element adapted to be electrically energized to generate heat, the case in which the heat generation element is received, an inner pipe arranged between the heat generation element and the case for insulating electricity, an inner mat arranged between the heat generation element and the inner pipe, and an outer mat arranged between the inner pipe and the case, the inner pipe includes a tubular portion that is arranged in the surrounding of the heat generation element and is formed in parallel to a central axis of the heat generation element, and a downstream side inclination portion that is arranged at the downstream side of the tubular portion, with an inside diameter thereof becoming smaller in a direction toward a downstream side. A downstream side bent portion, being a boundary between the tubular portion and the downstream side inclination portion, is formed in the vicinity of a downstream side end portion of the outer mat.

5 Claims, 4 Drawing Sheets

ELECTRICALLY HEATED CATALYST

CROSS-REFERENCE TO RELATED APPLICATION

This is a national phase application based on the PCT International Patent Application No. PCT/JP2011/073936 filed on Oct. 18, 2011, the entire contents of which are incorporated herein by reference.

TECHNICAL FIELD

The present invention relates to an electrically heated catalyst.

BACKGROUND ART

There has been known a technology in which an electrically heated catalyst is arranged at a location inside of an inner pipe of a double pipe (for example, see a first patent document).

In addition, there has also been known a technique in which a catalyst is arranged between an inner pipe and an outer pipe of a double pipe, wherein the inside diameter of a portion of the inner pipe at the upstream side of the catalyst is made smaller as it goes toward the upstream side (for example, refer to a second patent document).

Moreover, there has also been known a technique in which a catalyst is arranged at a location between an inner pipe and an outer pipe of a double pipe, or at a location inside of the inner pipe, wherein the inside diameter of a portion of the inner pipe at the upstream side of the catalyst is made smaller as it goes toward the upstream side (for example, refer to a third patent document).

Further, there has also been known a technique in which a catalyst is arranged at a location between an inner pipe and an outer pipe of a double pipe, and another catalyst is arranged at a location inside of the inner pipe, wherein the inside diameter of a portion of the inner pipe at the upstream side of the catalyst is made smaller as it goes toward the upstream side (for example, refer to a fourth patent document).

However, when particulate matter (PM) in the exhaust gas adheres to an inner pipe of a double pipe, there will be a fear that upon electrical energization of an electrically heated catalyst, electric current may pass to a case through the particulate matter. In order to suppress this, for example, it is possible to adopt a structure (a labyrinth structure) which serves to make it difficult for particulate matter to come or flow into between the inner pipe and the case. However, it is difficult to prevent the inflow of particulate matter in a complete manner. Here, the particulate matter having adhered to between the inner pipe and the case can be oxidized and removed by raising the temperature of the inner pipe. However, with the above structure, it will become difficult for the exhaust gas to flow through between the inner pipe and the case, the extent of the rise in the temperature due to the heat of the exhaust gas becomes small. For this reason, it becomes difficult to remove the particulate matter having adhered to between the inner pipe and the case. As a result, there is a fear that electricity may flow to the case through the particulate matter.

PRIOR ART REFERENCES

Patent Documents

[First Patent Document] Japanese patent application laid-open No. H08-232647

[Second Patent Document] Japanese patent application laid-open No. 2004-239107

[Third Patent Document] Japanese patent application laid-open No. 2005-127257

[Fourth Patent Document] Japanese patent application laid-open No. H11-002117

SUMMARY OF THE INVENTION

Problems to be Solved by the Invention

The present invention has been made in view of the above-mentioned problems, and an object of the present invention is to suppress electricity from flowing to a case of an electrically heated catalyst.

Means for Solving the Problems

In order to achieve the above-mentioned object, an electrically heated catalyst according to the present invention includes:

a heat generation element that is electrically energized to generate heat;

a case that receives said heat generation element therein;

an inner pipe that is arranged between said heat generation element and said case for insulating electricity;

an inner mat that is arranged between said heat generation element and said inner pipe to insulate electricity and at the same time to support said heat generation element, said inner mat being shorter in a direction of flow of an exhaust gas than said inner pipe;

an outer mat that is arranged between said inner pipe and said case to insulate electricity and at the same time to support said inner pipe, said outer mat being shorter in the direction of flow of the exhaust gas than said inner pipe;

wherein said inner pipe comprises a tubular portion that is arranged in the surrounding of said heat generation element, and is formed in parallel to a central axis of said heat generation element, and a downstream side inclination portion that is arranged at the downstream side of said tubular portion with an inside diameter thereof becoming smaller in a direction toward a downstream side; and a downstream side bent portion, being a boundary between said tubular portion and said downstream side inclination portion, is formed in the vicinity of a downstream side end portion of said outer mat.

The heat generation element may also be a carrier for the catalyst, or may also be arranged at the upstream side of the catalyst. By electrically energizing the heat generation element, the heat generation element generates heat, so that the temperature of the catalyst can be caused to rise. In addition, the inner mat and the outer mat are shorter in the direction of flow of the exhaust gas than the inner pipe. As a result, the inner pipe protrudes from the inner mat and the outer mat toward an upstream side thereof and a downstream side thereof, respectively, in the direction of flow of the exhaust gas. Here, note that the case may also be an outer pipe of a double pipe.

Here, the inner mat, the outer mat and the inner pipe are able to insulate electricity in themselves, but when particulate matter in the exhaust gas adheres to their surfaces, electricity may flow through the particulate matter. In order to suppress this, the downstream side bent portion, which is the boundary between the tubular portion and the downstream side inclination portion of the inner pipe, is formed in the vicinity of the downstream side end portion of the outer mat. That is, the inner pipe is bent toward a central axis side of the inner pipe in the vicinity of the downstream side end portion of the outer mat. For this reason, in the downstream side of the location at which the heat generation element is formed, the cross-sectional area of the exhaust passage becomes smaller than in the other portion thereof.

Then, the exhaust gas of high temperature after passing through the heat generation element directly impinges against the downstream side inclination portion at the downstream side of the downstream side bent portion, so the temperature of that portion of the inner pipe which is at the downstream side of the downstream side bent portion goes up easily. The heat thus generated transmits through the inner pipe, so that the temperature of the inner pipe as a whole goes up. In addition, the particulate matter having adhered to the portion of the inner pipe at the downstream side of the downstream side bent portion can be oxidized easily. However, even if the temperature of the inner pipe becomes high, the temperature at the side of the case is low, and hence, the heat of the inner pipe moves to the case side. Accordingly, there is a possibility that the rise in the temperature of the inner pipe may become slow. To cope with this, the outer mat is provided at the outer peripheral surface side of the tubular portion of the inner pipe. This outer mat acts as a heat insulating material, thereby making it possible to suppress the heat from being taken from the inner pipe. In addition, at the downstream side of the downstream side bent portion, the temperature of the inner pipe goes up easily due to the heat received from the exhaust gas, so the particulate matter can be caused to oxidize even without provision of the outer mat.

In addition, turbulence and pulsation of the exhaust gas are reduced due to the passage of the exhaust gas through the heat generation element. As a result of this, in the downstream side of the heat generation element, it is difficult for the particulate matter to come into between the case and the inner pipe.

In this manner, it is possible to raise the temperature of the inner pipe, while suppressing the particulate matter from invading into a space between the case and the inner pipe, as a consequence of which the oxidation of the particulate matter can be promoted. For this reason, it is possible to suppress electricity from flowing between the heat generation element and the case.

Moreover, in the present invention, said inner pipe may be provided with an upstream side inclination portion that is arranged at the upstream side of said tubular portion, with an inside diameter thereof becoming smaller in a direction toward an upstream side, and an upstream side bent portion, being a boundary between said tubular portion and said upstream side inclination portion, can be formed separately from an upstream side end portion of said outer mat.

That is, the inner pipe may be bent toward the central axis side of the inner pipe in the upstream side of the heat generation element, too. Here, in the upstream side of the heat generation element, it is difficult for the exhaust gas to impinge against the inner pipe, unlike in the downstream side of the heat generation element. For this reason, the temperature of the upstream side inclination portion does not go up easily, and so, if particulate matter has come into between the inner pipe and the case, there will be a fear that removal of the particulate matter may become difficult. On the other hand, the upstream side bent portion and the upstream side end portion of the outer mat are separated from each other. Here, the exhaust gas having flowed through the space between the inner pipe and the case along an outer peripheral surface of the upstream side inclination portion tends to go straight in an extending direction of the upstream side inclination portion at the downstream side of the upstream side bent portion, too.

Accordingly, if the upstream side bent portion and the upstream side end portion of the outer mat are separated from each other, in the downstream side of the upstream side bent portion, the exhaust gas will go toward a space on an extension line of the upstream side inclination portion. That is, the exhaust gas will go away from the tubular portion. For this reason, the exhaust gas becomes difficult to directly impinge against the outer peripheral surface of the tubular portion at the downstream side of the upstream side bent portion, thus making it difficult for the particulate matter to adhere to the outer peripheral surface of the tubular portion. According to this, it is possible to suppress electricity from flowing through the particulate matter.

Further, even if the exhaust gas flows into the space between the case and the inner pipe, particulate matter is suppressed from adhering to the outer peripheral surface of the tubular portion, so it is possible to cause a relatively large amount of exhaust gas to flow into the space between the case and the inner pipe. As a result of this, the temperature of the inner pipe can be made high, so that the oxidation of the particulate matter can be promoted. Here, note that the upstream side bent portion and the upstream side end portion of the outer mat may be separated by a predetermined distance at which creeping discharge does not occur.

In addition, in the present invention, an upstream side end portion of said inner mat and an upstream side end portion of said heat generation element can be located in the vicinity of said upstream side bent portion.

Here, it is difficult to completely prevent particulate matter from adhering to the outer peripheral surface of the tubular portion between the upstream side bent portion and the upstream side end portion of the outer mat. On the other hand, if the upstream side end portion of the heat generation element is located in the vicinity of the upstream side bent portion, it is possible to supply heat from the heat generation element to the tubular portion. As a result of this, the temperature of the outer peripheral surface of the tubular portion at the downstream side of the upstream side bent portion can be made higher, so that the oxidation of the particulate matter can be promoted. Further, because the temperature of the inner pipe becomes higher, a difference in temperature between the inner pipe and the case becomes larger, so that the particulate matter can be caused to move to the case side from the inner pipe side by means of a thermophoresis effect. According to this, it is possible to suppress the particulate matter from adhering to the outer peripheral surface of the tubular portion.

Moreover, in the present invention, provision can be made for a heat transfer portion that serves to connect said inner pipe and said heat generation element with each other so as to transfer heat therebetween.

Here, due to the existence of the inner mat, it becomes difficult for the heat of the heat generation element to conduct to the inner pipe. In contrast to this, due to the provision of the heat transfer portion, it is possible to supply a more amount of heat of the heat generation element to the inner pipe. As a result of this, the temperature of the inner pipe can be made higher, thereby making it possible to promote the oxidation of the particulate matter having adhered to the inner pipe.

Further, in the present invention, said inner pipe may be provided on a surface of the outer peripheral surface of said tubular portion with an insulating material which serves to insulate electricity, but may not be provided with an insulating material on a surface of said upstream side inclination portion and on a surface of the inner peripheral surface of said tubular portion.

The insulating material is coated on the surface of the inner pipe, for example. Although this insulating material insulates electricity, in general, it has a high heat insulating effect, too. For this reason, if provided with the insulating material, the inner pipe will become difficult to receive heat from the exhaust gas. On the other hand, because the upstream side inclination portion is not provided with the insulating material, the upstream side inclination portion is easy to receive heat from the exhaust gas. As a result of this, the temperature of the inner pipe can be made higher, thereby making it possible to promote the oxidation of the particulate matter having adhered to the inner pipe. In addition, in the tubular portion, heat can be received from the heat generation element, so the temperature of the tubular portion goes up easily. Further, it is difficult for the exhaust gas to directly impinge against the outer peripheral surface of the tubular portion, so that particulate matter is hard to adhere to the outer peripheral surface of the tubular portion. Then, if the insulating material is provided on only the outer peripheral surface of the tubular portion, electricity can be interrupted on the outer peripheral surface.

In addition, in the present invention, an inside diameter of an upstream side end portion of said case may be smaller than an inside diameter of an upstream side end portion of said inner pipe, and an inside diameter of a downstream side end portion of said case may be larger than an inside diameter of a downstream side end portion of said inner pipe.

In that case, it becomes more difficult for the exhaust gas to flow into the space between the case and the inner pipe in the upstream side and the downstream side of the heat generation element, thus making it possible to suppress the particulate matter from adhering to them.

Moreover, in the present invention, said case may have an introduction pipe extending from its upstream side end portion toward its downstream side, with an inside diameter of said introduction pipe being smaller than the inside diameter of the upstream side end portion of said inner pipe;

said introduction pipe may have a downstream side end portion located at the upstream side of the upstream side end portion of said inner pipe; and an outside diameter of the downstream side end portion of said introduction pipe may be larger than the inside diameter of the upstream side end portion of said inner pipe.

In that case, it becomes easy for the exhaust gas having passed through the introduction pipe to flow into the central axis side of the inner pipe. In addition, even if the exhaust gas has rebounded from the heat generation element to flow back, it is possible to suppress the exhaust gas from flowing into between the case and the inner pipe, by the impingement of the exhaust gas against the introduction pipe. As a result of this, it is possible to suppress the particulate matter from adhering between the case and the inner pipe.

Further, in the present invention, said case may have an introduction pipe extending from its upstream side end portion toward its downstream side, with an inside diameter of said introduction pipe being smaller than the inside diameter of the upstream side end portion of said inner pipe; and when assuming that the upstream side inclination portion of said inner pipe is extended to a central axis of the inner pipe, the upstream side inclination portion assumed to be extended may not intersect said introduction pipe.

In that case, even if the exhaust gas having impinged against and rebounded from the heat generation element flows through the space on the extended line of the upstream side inclination portion after having gone to the upstream side along the upstream side inclination portion of the inner pipe, it is possible to suppress the exhaust gas from impinging against the outer peripheral surface of the introduction pipe. For this reason, the exhaust gas having flowed back is pushed back by an exhaust gas flowing through the interior of the introduction pipe in the direction toward the downstream side thereof, it is possible to suppress the exhaust gas from flowing into between the inner pipe and the case. That is, it is possible to suppress the particulate matter from adhering between the inner pipe and the case.

Effect of the Invention

According to the present invention, it is possible to suppress electricity from flowing to the case of the electrically heated catalyst.

MODES FOR CARRYING OUT THE INVENTION

Hereinafter, reference will be made to specific embodiments of an electrically heated catalyst according to the present invention based on the attached drawings. Here, note that the following embodiments can be combined as appropriate.

First Embodiment

Figure 1:
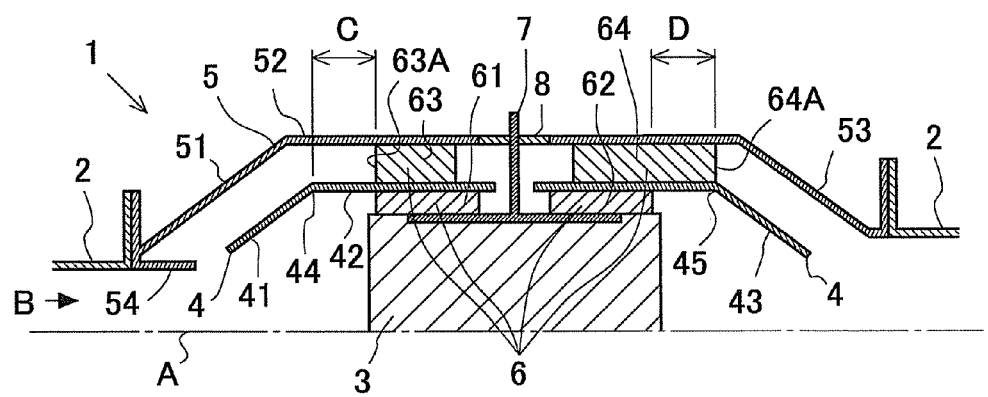
FIG. 1 is a view showing the schematic construction of an electrically heated catalyst according to a first embodiment of the present invention.

FIG. 1 is a view showing the schematic construction of an electrically heated catalyst 1 according to this first embodiment of the present invention. Here, note that the electrically heated catalyst 1 according to this embodiment is arranged in an exhaust pipe 2 of an internal combustion engine mounted on a vehicle. The internal combustion engine may be a diesel engine, or may be a gasoline engine. In addition, the electrically heated catalyst 1 can also be used in a vehicle which adopts a hybrid system equipped with an electric motor.

The electrically heated catalyst 1 shown in FIG. 1 is a cross sectional view cutting the electrically heated catalyst 1 along a central axis A thereof in a longitudinal direction thereof. Here, note that the electrically heated catalyst 1 has a shape with line symmetry with respect to the central axis A, and hence in FIG. 1, only an upper part thereof is shown. In addition, in FIG. 1, an arrow B shows the direction of the flow of an exhaust gas.

The electrically heated catalyst 1 according to this embodiment is provided with a catalyst carrier 3 which has a cylindrical or columnar shape around the central axis A. And, the catalyst carrier 3, an inner pipe 4, and a case 5 are provided sequentially from the side of the central axis A. In addition, a mat 6 is arranged between the catalyst carrier 3 and the inner pipe 4, and between the inner pipe 4 and the case 5.

A material, which has electric resistance and is electrically energized to generate heat, is used for the catalyst carrier 3. SiC is used for the material of the catalyst carrier 3, for example. The catalyst carrier 3 has a plurality of passages which extend in a direction of flow B of the exhaust gas (i.e., it may be the direction of the central axis A), and which have a cross section of honeycomb shape vertical to the direction in which the exhaust gas flows. The exhaust gas flows through these passages. The catalyst carrier 3 has an outer shape which is a cylindrical or columnar shape around the central axis A of the exhaust pipe 2, for example. Here, note that the sectional shape of the catalyst carrier 3 formed by the cross section which is orthogonal to the central axis A may be an elliptical shape, for example. The central axis A is a central axis common to the exhaust pipe 2, the catalyst carrier 3, the inner pipe 4, and the case 5. Also, note that in this embodiment, the catalyst carrier 3 corresponds to a heat generation element in the present invention. In addition, this embodiment can be applied similarly to a heat generation element in cases where the heat generation element is provided at the upstream side of a catalyst, too.

A catalyst is carried or supported by the catalyst carrier 3. As the catalyst, there can be mentioned an oxidation catalyst, a three-way catalyst, an NOx storage reduction catalyst, an NOx selective reduction catalyst, etc., for example. Two pieces of electrodes 7 are connected to the catalyst carrier 3, so that the catalyst carrier 3 is electrically energized by applying a voltage between these electrodes 7. The catalyst carrier 3 generates heat due to the electric resistance of this catalyst carrier 3.

As the material of the inner pipe 4, there is used an electric insulator such as, for example, alumina. In addition, the inner pipe 4 may be one which is an electric conductor such as metal, etc., with its surface being coated with an electric insulator. The inner pipe 4 is constructed to be provided with an upstream side inclination portion 41, a tubular portion 42, and a downstream side inclination portion 43, which are sequentially arranged from an upstream side thereof. The upstream side inclination portion 41 is inclined with respect to the central axis A in such a manner that its inside diameter becomes larger as it goes to a downstream side thereof. The upstream side inclination portion 41 has an upstream side end portion opened, so that the exhaust gas flows into the inside of the inner pipe 4 through the upstream side end portion. In addition, the upstream side inclination portion 41 has a downstream side end portion connected to an upstream side end portion of the tubular portion 42.

The tubular portion 42 is formed into a tubular shape with the central axis A being located as a center thereof. The tubular portion 42 is composed of a surface parallel to the central axis A. The tubular portion 42 has a downstream side end portion connected to an upstream side end portion of the downstream side inclination portion 43. The downstream side inclination portion 43 is inclined with respect to the central axis A in such a manner that its inside diameter becomes smaller as it goes toward the downstream side thereof. The downstream side end portion of the downstream side inclination portion 43 is open, so that the exhaust gas flows out from the inside of the inner pipe 4 through the downstream side end portion. Here, note that the tubular portion 42 may be divided into an upstream side and a downstream side with respect to the electrodes 7. In addition, a certain amount of distance is formed between each electrode 7 and the tubular portion 42 in such a manner that electric discharge does not occur.

Here, note that a boundary between the upstream side inclination portion 41 and the tubular portion 42 is a location where the inner pipe 4 is bent, and is hereinafter referred to as an upstream side bent portion 44. Also, a boundary between the tubular portion 42 and the downstream side inclination portion 43 is a location where the inner pipe 4 is bent, and is hereinafter referred to as a downstream side bent portion 45.

Metal is used for the material of the case 5, and for example, a stainless steel material can be used. Here, note that this case 5 may also be an outer pipe of a double pipe. Then, in order to let the electrodes 7 pass through, the case has holes opened therein, and a certain amount of distance or space is provided between the case 5 and each electrode 7 so that electric discharge does not occur. Then, the insulation parts 8, which serve to support the electrodes 7, respectively, are arranged in the holes, respectively, which are opened in the case 5. An electric insulator is used for the material of the insulation parts 8. In addition, the insulation parts 8 are arranged with no gap between the case 5 and the electrodes 7, respectively.

The case 5 be constructed to be provided with an upstream side inclination portion 51, a tubular portion 52, and a downstream side inclination portion 53 sequentially from an upstream side. The upstream side inclination portion 51 is inclined with respect to the central axis A so that its inside diameter becomes larger as its goes toward a downstream side. The upstream side inclination portion 51 has an upstream side end portion opened, so that the exhaust gas flows into the inside of the case 5 through the upstream side end portion. In addition, the upstream side inclination portion 51 has a downstream side end portion connected to an upstream side end portion of the tubular portion 52.

The tubular portion 52 is formed into a tubular shape with the central axis A being located as a center thereof. The tubular portion 52 is composed of a surface parallel to the central axis A. The tubular portion 52 has a downstream side end portion connected to an upstream side end portion of the downstream side inclination portion 53. The downstream side inclination portion 53 is inclined with respect to the central axis A in such a manner that its inside diameter becomes smaller as it goes toward the downstream side thereof. The downstream side end portion of the downstream side inclination portion 53 is open, so that the exhaust gas flows out from the inside of the case 5 to the exhaust pipe 2 through the downstream side end portion.

The upstream side end portion and the downstream side end portion of the case 5 are each formed with a flange with which they are connected with the exhaust pipe 2. In addition, an introduction pipe 54 is formed in a direction from the upstream side end portion toward the downstream side of the case 5. The introduction pipe 54 is formed into a tubular shape around the central axis A, so that it extends in parallel with the central axis A in a range at the upstream side of the upstream side end portion of the inner pipe 4. The introduction pipe 54 has an inside diameter which is equal to that of the upstream side end portion of the upstream side inclination portion 51 of the case 5.

As the mat 6, there is used an electric insulator such as, for example, ceramic fiber which includes alumina as its main component. The mat 6 is wound around an outer peripheral surface of the catalyst carrier 3 and an outer peripheral surface of the inner pipe 4. The mat 6 covers the outer peripheral surface (the surface parallel to the central axis A) of the catalyst carrier 3, so that when the catalyst carrier 3 is electrically energized, the mat 6 serves to suppress electricity from flowing to the inner pipe 4 and the case 5.

The mat 6 is composed of inner mats 61, 62 which are arranged between the tubular portion 42 of the inner pipe 4 and the catalyst carrier 3, and outer mats 63, 64 which are arranged between the tubular portion 52 of the case 5 and the tubular portion 42 of the inner pipe 4. In addition, the inner mats 61, 62 include the inner mat 61 at the upstream side of the electrodes 7, and the inner mat 62 at the downstream side of the electrodes 7. Moreover, the outer mats 63, 64 include the outer mat 63 at the upstream side of the electrodes 7, and the outer mat 64 at the downstream side of the electrodes 7.

The outside diameters of the inner mats 61, 62 when these inner mats 61, 62 are wound around the catalyst carrier 3 are larger than the inside diameter of the inner pipe 4. For this reason, when the inner mats 61, 62 are received or inserted into the inner pipe 4, these inner mats 61, 62 are compressed, so the catalyst carrier 3 is fixed into the inner pipe 4 due to a repulsive force or resilience of the inner mats 61, 62.

The outside diameters of the outer mats 63, 64 when these outer mats 63, 64 are wound around the inner pipe 4 are larger than the inside diameter of the case 5. For this reason, when the outer mats 63, 64 are received or inserted into the case 5, these outer mats 63, 64 are compressed, so the inner pipe 4 is fixed into the case 5 due to a repulsive force or resilience of the outer mats 63, 64. In addition, the inner pipe 4 protrudes from the mat 6 to an upstream side thereof and a downstream side thereof, respectively.

Here, note that in this embodiment, the inner mats 61, 62 and the outer mats 63, 64 are explained as being divided into the upstream side and the downstream side with respect to the electrodes 7, but they may be formed integral with each other, other than the surroundings of the electrodes 7.

Here, due to the inner pipe 4 being provided with the upstream side inclination portion 41, it becomes difficult for the exhaust gas of the internal combustion engine to come into between the inner pipe 4 and the case 5. However, if the exhaust gas of the internal combustion engine does not come into between the inner pipe 4 and the case 5, the temperature rise of the inner pipe 4 will become slow, and it will become difficult to oxidize particulate matter having adhered to the inner pipe 4. On the other hand, if the inner pipe 4 is formed so that a large amount of exhaust gas flow into between the inner pipe 4 and the case 5 in order to make the temperature of the inner pipe 4 high, there will be a fear that particulate matter may adhere to between the inner pipe 4 and the case 5. Then, when the amount of particulate matter having adhered to the mat 6 and the inner pipe 4 increases, electricity may flow through the particulate matter.

In contrast to this, in this embodiment, an upstream side end portion 63A of the outer mat 63 and the upstream side bent portion 44 are separated from each other by a predetermined distance C. That is, an outer peripheral surface of the tubular portion 42 of the inner pipe 4 is exposed in the upstream side of the upstream side end portion 63A of the outer mat 63.

Here, the exhaust gas flowing into between the inner pipe 4 and the case 5 flows along the upstream side inclination portion 41. This exhaust gas tries to go in the direction of an extension line of the upstream side inclination portion 41, in the upstream side bent portion 44, too. For this reason, the flow of the exhaust gas is moving away from the outer peripheral surface of the tubular portion 42 of the inner pipe 4. In that case, the exhaust gas does not directly impinge against the outer peripheral surface of the tubular portion 42 of the inner pipe 4 at the downstream side of the upstream side bent portion 44 and at the upstream side of the upstream side end portion 63A of the outer mat 63. Thus, because the exhaust gas not directly impinge against this place, it becomes difficult for particulate matter to adhere thereto. That is, by separating the upstream side end portion 63A of the outer mat 63 and the upstream side bent portion 44 from each other by the predetermined distance C, it is possible to suppress the particulate matter from adhering to the outer peripheral surface of the inner pipe 4 lying therebetween. Here, note that the predetermined distance C is, for example, a distance which can suppress creeping discharge between the upstream side bent portion 44 and the upstream side end portion 63A of the outer mat 63, and an optimum value of the predetermined distance C may be obtained through experiments, etc.

Then, if particulate matter has not adhered to the outer peripheral surface of the tubular portion 42 of the inner pipe 4 even when particulate matter has adhered to the upstream side inclination portion 41 of the inner pipe 4, it is possible to suppress electricity from flowing between the catalyst carrier 3 and the case 5 through the particulate matter. That is, because at least the surface of the inner pipe 4 is an electric insulator, electricity does not flow if particulate matter has not adhered thereto. In addition, in this embodiment, even if it is constructed such that the exhaust gas flows into between the inner pipe 4 and the case 5, it is possible to suppress the particulate matter from adhering to the tubular portion 42 of the inner pipe 4. For this reason, the exhaust gas can be made to flow in between the inner pipe 4 and the case 5, thereby making it possible to raise the temperature of the inner pipe 4. As a result of this, it is possible to promote the oxidation of the particulate matter.

On the other hand, in this embodiment, the outer mat 64 has a downstream side end portion 64A extending up to the downstream side bent portion 45. That is, the downstream side end portion 64A of the outer mat 64 is located in the vicinity of the downstream side bent portion 45. For this reason, the outer mat 64 is made longer to the downstream side by a predetermined distance D than the inner mat 62.

Here, similar to the case of the upstream side end portion 63A of the outer mat 63, assuming that a space or distance is provided between the downstream side end portion 64A of the outer mat 64 and the downstream side bent portion 45, the area of the exposed portion of the inner pipe 4 becomes large. In that case, there will also be a fear that the temperature of the inner pipe 4 may become low. That is, in the downstream side of the catalyst carrier 3, the exhaust gas of relatively high temperature heated in the catalyst carrier 3 flows, and besides, the exhaust gas directly impinges against the downstream side inclination portion 43, so the temperature of the inner pipe 4 becomes relatively high.

On the other hand, the case 5, being in contact with outside air, is relatively low in temperature. For this reason, heat transfers from the inner pipe 4 to the case 5, thus giving rise to a fear that the temperature of the inner pipe 4 may become low. Here, the mat 6 composed of ceramic fiber including alumina as a main component is high in thermal insulation because the ceramic fiber itself is hard to conduct heat, and a large amount of gas is contained in the mat 6. That is, the downstream side end portion 64A of the outer mat 64 is made to extend up to the downstream side bent portion 45, whereby the outer mat 64 acts as a heat insulator. According to this, it is possible to suppress heat transfer from the outer peripheral surface of the tubular portion 42 of the inner pipe 4 to the case 5.

In addition, turbulence and pulsation of the exhaust gas are reduced to a large extent due to the passage of the exhaust gas of the internal combustion engine through the catalyst carrier 3. For this reason, at the downstream side of the catalyst carrier 3, it is difficult for the exhaust gas to flow into between the inner pipe 4 and the case 5, thus making it difficult for particulate matter to adhere to between the inner pipe 4 and the case 5. Accordingly, it is not necessary to expose the outer peripheral surface of the tubular portion 42 of the inner pipe 4 in the surrounding of the downstream side bent portion 45.

Here, note that an upstream side end face of the inner mat 61 and an upstream side end face of the catalyst carrier 3 are set to be on the same plane, or to be located at a relatively short distance from each other. Also, a downstream side end face of the inner mat 62 and a downstream side end face of the catalyst carrier 3 are set to be on the same plane, or to be located at a relatively short distance from each other.

As described above, in this embodiment, the upstream side end portion 63A of the outer mat 63 and the upstream side bent portion 44 are separated from each other by the predetermined distance C, and hence, it is possible to suppress particulate matter from adhering to the outer peripheral surface of the tubular portion 42 of the inner pipe 4, in the upstream side of the upstream side end portion 63A of the outer mat 63. As a result of this, it is possible to suppress electricity from flowing through the particulate matter. In addition, because the exhaust gas can be made to flow between the upstream side inclination portion 41 of the inner pipe 4 and the upstream side inclination portion 51 of the case 5, it is possible to raise the temperature of the inner pipe 4, thus making it possible to promote the oxidation of particulate matter.

Moreover, by arranging the downstream side end portion 64A of the outer mat 64 and the downstream side bent portion 45 near to each other, it is possible to suppress heat transfer from the tubular portion 42 of the inner pipe 4 to the case 5. As a result, the temperature of the inner pipe 4 can be kept high, thereby making it possible to promote the oxidation of the particulate matter having adhered to the inner pipe 4. According to this, it is possible to suppress electricity from flowing through the particulate matter.

Second Embodiment

Figure 2:
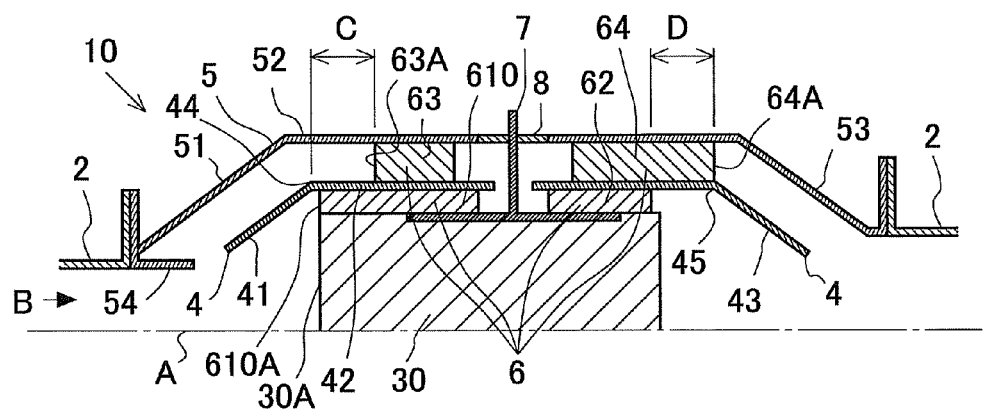
FIG. 2 is a view showing the schematic construction of an electrically heated catalyst according to a second embodiment of the present invention.

FIG. 2 is a view showing the schematic construction of an electrically heated catalyst 10 according to this second embodiment of the present invention. The electrically heated catalyst 10 shown in FIG. 2 is a cross sectional view cutting the electrically heated catalyst 10 along a central axis A thereof in a longitudinal direction thereof. Here, note that the electrically heated catalyst 10 has a shape with line symmetry with respect to the central axis A, and hence in FIG. 2, only an upper part thereof is shown.

In this embodiment, the shapes of a catalyst carrier 30 and an inner mat 610 are different from those in the first embodiment, so an explanation thereof will be made. In this embodiment, an upstream side end portion 610A of the inner mat 610 and an upstream side end portion 30A of the catalyst carrier 30 are extended to the upstream side more than in the case of the first embodiment. In addition, the upstream side end portion 610A of the inner mat 610 and the upstream side end portion 30A of the catalyst carrier 30 are located on or in the vicinity of a plane which is orthogonal to the central axis A and includes an upstream side bent portion 44. This brings the inner mat 610 and the catalyst carrier 30 close to an upstream side inclination portion 41 of an inner pipe 4.

In the electrically heated catalyst 10 constructed in this manner, when a part of the exhaust gas having flowed from the upstream side of the catalyst carrier 30 rebounds from the catalyst carrier 30, the exhaust gas becomes liable to impinge against the upstream side inclination portion 41 of the inner pipe 4. As a result of this, at the time of cold starting of an internal combustion engine, it is possible to raise the temperature of the upstream side inclination portion 41 in a quick manner. In that case, due to a thermophoresis effect, it is possible to suppress particulate matter from adhering to an outer peripheral surface of the inner pipe 4.

In addition, heat can be supplied from the inside of the inner pipe 4 to an exposed portion of the outer peripheral surface of the tubular portion 42 of the inner pipe 4 by means of the catalyst carrier 30. According to this, even if particular matter has adhered to the exposed portion of the outer peripheral surface of the tubular portion 42 of the inner pipe 4, the particulate matter can be quickly oxidized. As a result of this, it is possible to suppress electricity from flowing through the particulate matter.

Moreover, the area of an exposed portion in the inner pipe 4 can be made small, so that the heat transferring to the inner pipe 4 from the exhaust gas decreases. Therefore, it is possible to raise the temperature of the exhaust gas flowing into the catalyst carrier 30. As a result, the temperature of the catalyst carrier 30 can be raised in a quick manner.

Third Embodiment

Figure 3:
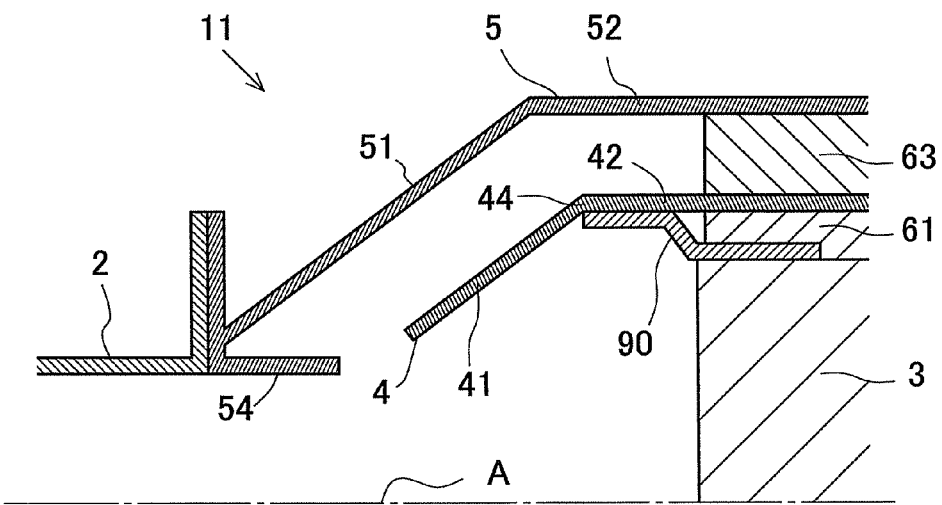
FIG. 3 is a view showing the schematic construction of an electrically heated catalyst according to a third embodiment of the present invention.

FIG. 3 is a view showing the schematic construction of an electrically heated catalyst 11 according to this third embodiment of the present invention. The electrically heated catalyst 11 shown in FIG. 3 is a cross sectional view cutting the electrically heated catalyst 11 along a central axis A thereof in a longitudinal direction thereof. Here, note that the electrically heated catalyst 11 has a shape with line symmetry with respect to the central axis A, and hence in FIG. 3, only an upper part thereof is shown. In addition, a portion of the electrically heated catalyst 11 at the downstream side of the portion thereof shown in FIG. 3 has the same structure as that of the electrically heated catalyst 1 shown in FIG. 1, and hence is omitted.

In this embodiment, provision is made for a heat transfer portion 90 which serves to connect an inner peripheral surface of an inner pipe 4 at the upstream side of an inner mat 61 and an outer peripheral surface of a catalyst carrier 3 with each other. This heat transfer portion 90 has a relatively high heat conductivity, and is composed of metal, for example.

Here, by adopting ceramic fiber as the inner mat 61, for example, it is possible to support the catalyst carrier 3, while suppressing breakage thereof. In addition, a temperature drop of the catalyst carrier 3 can be suppressed according to a heat insulation effect of the inner mat 61. However, due to the existence of the inner mat 61, it becomes difficult for the heat of the catalyst carrier 3 to conduct to the inner pipe 4.

On the other hand, in the electrically heated catalyst 11 according to this embodiment, heat can be supplied from the catalyst carrier 3 to the inner pipe 4 through the heat transfer portion 90. Due to this heat, the temperature of the inner pipe 4 can be raised. Accordingly, the oxidation of particulate matter having adhered to the inner pipe 4 can be promoted, thus making it possible to suppress electricity from flowing through the particulate matter. Here, note that the heat transfer portion 90 may be connected to the catalyst carrier 3 at a location near the central axis A from the outer peripheral surface thereof. In addition, the heat transfer portion 90 may be connected to an upstream side inclination portion 41 of the inner pipe 4.

Fourth Embodiment

Figure 4:
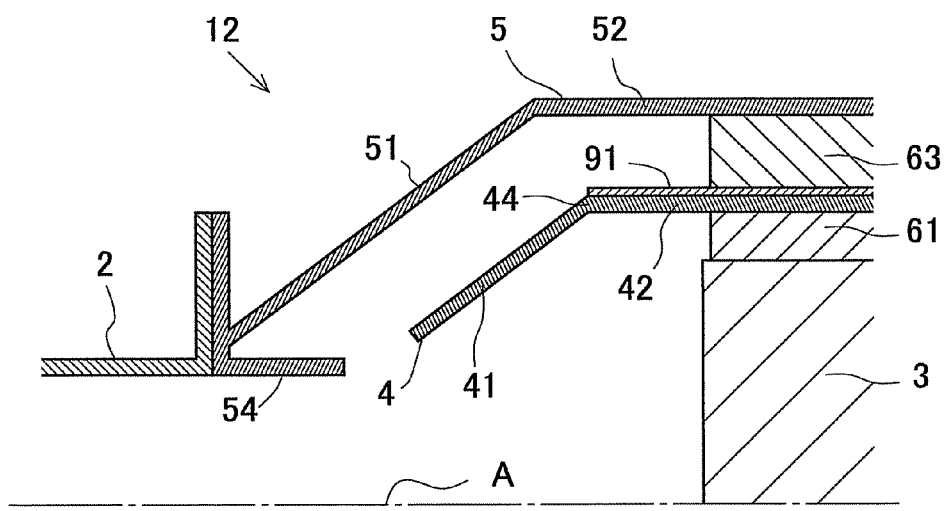
FIG. 4 is a view showing the schematic construction of an electrically heated catalyst according to a fourth embodiment of the present invention.

FIG. 4 is a view showing the schematic construction of an electrically heated catalyst 12 according to this fourth embodiment of the present invention. The electrically heated catalyst 12 shown in FIG. 4 is a cross sectional view cutting the electrically heated catalyst 12 along a central axis A thereof in a longitudinal direction thereof. Here, note that the electrically heated catalyst 12 has a shape with line symmetry with respect to the central axis A, and hence in FIG. 4, only an upper part thereof is shown. In addition, a portion of the electrically heated catalyst 12 at the downstream side of the portion thereof shown in FIG. 4 has the same structure as that of the electrically heated catalyst 1 shown in FIG. 1, and hence is omitted.

Here, in this embodiment, an inner pipe 4 made of metal is adopted. In addition, an insulating layer 91 is formed only in an outer peripheral surface of a tubular portion 42 of the inner pipe 4. This insulating layer 91 is composed of an electric insulator. That is, the insulating layer 91 is not formed on a surface of an upstream side inclination portion 41 of the inner pipe 4, and on an inner peripheral surface of the tubular portion 42 of the inner pipe 4. In a location in which this insulating layer 91 is formed, it is possible to suppress electricity from flowing to the surface thereof. However, if particulate matter adheres to the surface of the insulating layer 91, electricity can flow thereto through the particulate matter. On the other hand, in a location in which the insulating layer 91 is not formed, even if particulate matter does not adhere to the surface of the location, electricity can flow thereto.

The insulating layer 91 insulates electricity, but in general, such a layer or material has a high heat insulating effect, too. Accordingly, in the location in which the insulating layer 91 is formed, it becomes difficult to receive heat from outside, thus making it difficult for the temperature thereof to go up. In contrast to this, in this embodiment, the insulating layer 91 is formed only in the outer peripheral surface of the tubular portion 42 of the inner pipe 4. In that case, in other locations of the inner pipe 4, it becomes easy to receive heat from the exhaust gas or the catalyst carrier 3, so that the temperatures in the other locations go up easily. In this manner, it becomes easy for the temperature of the inner pipe 4 to go up, thus making it possible to promote the oxidation of the particulate matter adhered to the inner pipe 4. In addition, the cost of manufacture can be reduced by making the area of the insulating layer 91 small.

In addition, the exhaust gas does not directly impinge against the outer peripheral surface of the tubular portion 42 of the inner pipe 4, so the outer peripheral surface of the tubular portion 42 is hard to receive heat from the exhaust gas, even without the provision of the insulating layer 91. Accordingly, even if the insulating layer 91 is formed on the outer peripheral surface of the tubular portion 42 of the inner pipe 4, there will be almost no influence on the temperature of the inner pipe 4. Then, if the insulating layer 91 is formed in this place, it is possible to suppress electricity from flowing to the case 5.

Fourth Embodiment

Figure 5:
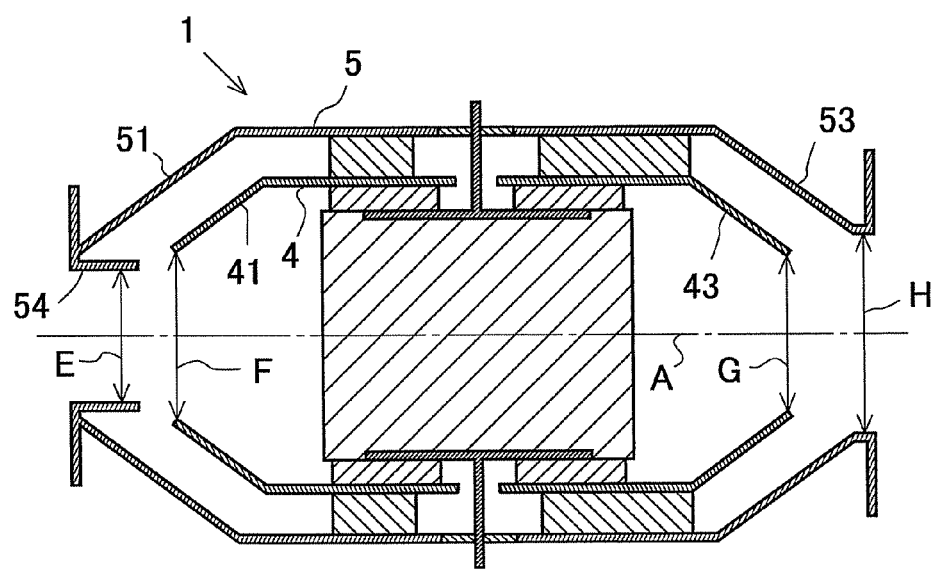
FIG. 5 is a view showing the schematic construction of an electrically heated catalyst according to a fifth embodiment of the present invention.

FIG. 5 is a view showing the schematic construction of an electrically heated catalyst 1 according to this fifth embodiment of the present invention. The electrically heated catalyst 1 shown in FIG. 5 is a cross sectional view cutting the electrically heated catalyst 1 along a central axis A thereof in a longitudinal direction thereof.

Here, in the electrically heated catalyst 1 according to this embodiment, it is formed such that an introduction pipe 54 has an inside diameter E which is smaller than an inside diameter F of an upstream side end portion of an upstream side inclination portion 41 of an inner pipe 4. Also, the introduction pipe 54 has a downstream side end portion located at the upstream side of the upstream side end portion of the upstream side inclination portion 41 of the inner pipe 4.

In the electrically heated catalyst 1 constructed in this manner, it becomes easy for the exhaust gas passing through the introduction pipe 54 to flow into the inside of the inner pipe 4. For this reason, at the upstream side of a catalyst carrier 3, it is possible to suppress the exhaust gas from flowing into between the inner pipe 4 and a case 5, thus making it possible to suppress particulate matter from adhering to between the inner pipe 4 and the case 5. As a result, it is possible to suppress electricity from flowing to the case 5.

In addition, in the electrically heated catalyst 1 according to this embodiment, it is also formed such that a downstream side end portion of a downstream side inclination portion 43 of the inner pipe 4 has an inside diameter G which is smaller than an inside diameter H of a downstream side end portion of a downstream side inclination portion 53 of the case 5. Also, the downstream side end portion of the downstream side inclination portion 43 of the inner pipe 4 is located at the upstream side of the downstream side end portion of the downstream side inclination portion 53 of the case 5.

In the electrically heated catalyst 1 constructed in this manner, it becomes easy for the exhaust gas passing flowing out from the inside of the inner pipe 4 to be discharged from the downstream side end portion of the downstream side inclination portion 53 of the case 5. As a result of this, in the downstream side of the catalyst carrier 3, it is possible to suppress the exhaust gas from flowing into between the inner pipe 4 and the case 5, thus making it possible to suppress particulate matter from adhering to between the inner pipe 4 and the case 5. Accordingly, it is possible to suppress electricity from flowing to the case 5.

Here, note that the distance between the inner pipe 4 and the case 5 is set as a distance which can suppress electric discharge from occurring when the catalyst carrier 3 is electrically energized. This distance can be obtained through experiments, etc.

Sixth Embodiment

Figure 6:
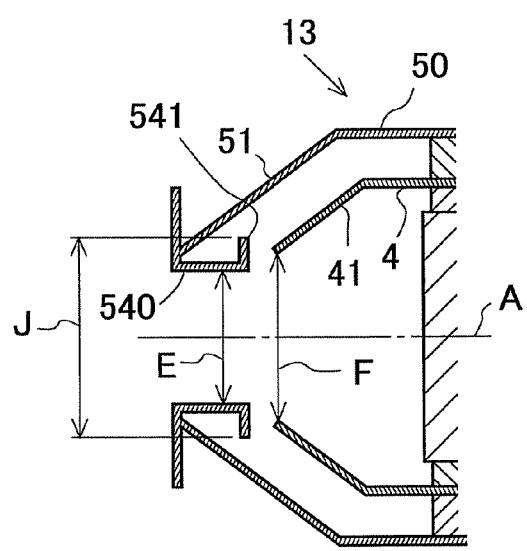
FIG. 6 is a view showing the schematic construction of an electrically heated catalyst according to a sixth embodiment of the present invention.

FIG. 6 is a view showing the schematic construction of an electrically heated catalyst 13 according to this sixth embodiment of the present invention. The electrically heated catalyst 13 shown in FIG. 6 is a cross sectional view cutting the electrically heated catalyst 13 along a central axis A thereof in a longitudinal direction thereof. Here, note that the electrically heated catalyst 13 has a shape with line symmetry with respect to the central axis A, and hence in FIG. 6, only an upper part thereof is shown. In addition, a portion of the electrically heated catalyst 13 at the downstream side of the portion thereof shown in FIG. 6 has the same structure as that of the electrically heated catalyst 1 shown in FIG. 1, and hence is omitted.

In this embodiment, in a downstream side end portion of an introduction pipe 540, there is formed a flange 541 which is bent to the outside of the introduction pipe 540 at right angles thereto. This flange 541 has an inside diameter equal to an inside diameter E of the introduction pipe 540. Then, in this embodiment, the inside diameter E of this introduction pipe 540 is formed to be smaller than an inside diameter F of an upstream side end portion of an upstream side inclination portion 41 of an inner pipe 4. Also, the introduction pipe 540 has a downstream side end portion located at the upstream side of the upstream side end portion of the upstream side inclination portion 41 of the inner pipe 4. Further, the flange 541 has an outside diameter J which is formed to be larger than the inside diameter F of the upstream side end portion of the upstream side inclination portion 41 of the inner pipe 4.

In the electrically heated catalyst 13 constructed in this manner, it becomes easy for the exhaust gas passing through the introduction pipe 540 to flow into the inside of the inner pipe 4. Moreover, even if the exhaust gas flowing back after having impinged against a catalyst carrier 3 flows out of the inner pipe 4 to an upstream side thereof, the exhaust gas impinges against the flange 541. If it is assumed that the flange 541 does not exist, there will be a fear that the exhaust gas flowing back may go along an outer peripheral surface of the introduction pipe 540, and thereafter may rebound from an upstream side inclination portion 51 of a case 50, flowing into between the inner pipe 4 and the case 50. In contrast to this, due to the impingement of the exhaust gas against the flange, it becomes difficult for the exhaust gas to flow in between the inner pipe 4 and the case 50. As a result, it is possible to suppress particulate matter from adhering between the inner pipe 4 and the case 50.

Here, note that in this embodiment, the flange 541 is formed, but instead of this, the thickness of the introduction pipe 540 may be made large. That is, an outside diameter of the introduction pipe 540 may be made larger than the inside diameter F of the upstream side end portion of the upstream side inclination portion 41 of the inner pipe 4.

Seventh Embodiment

Figure 7:
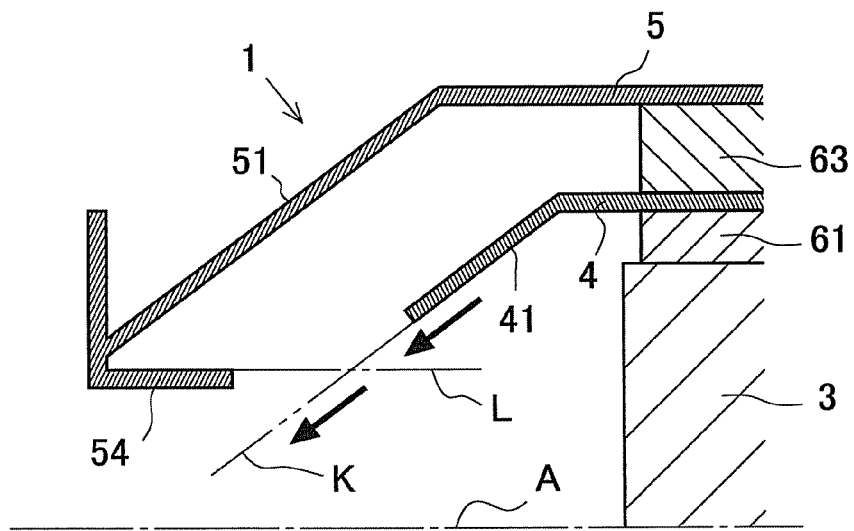
FIG. 7 is a view showing the schematic construction of an electrically heated catalyst according to a seventh embodiment of the present invention.

FIG. 7 is a view showing the schematic construction of an electrically heated catalyst 1 according to this seventh embodiment of the present invention. The electrically heated catalyst 1 shown in FIG. 7 is a cross sectional view cutting the electrically heated catalyst 1 along a central axis A thereof in a longitudinal direction thereof. Here, note that the electrically heated catalyst 1 has a shape with line symmetry with respect to the central axis A, and hence in FIG. 1, only an upper part thereof is shown. In addition, a portion of the electrically heated catalyst 1 at the downstream side of the portion thereof shown in FIG. 7 has the same structure as that of the electrically heated catalyst 1 shown in FIG. 1, and hence is omitted.

Here, in this embodiment, an upstream side inclination portion 41 of an inner pipe 4 and an introduction pipe 54 are formed in such a manner that a surface K (hereinafter referred to as an inner pipe extension face K) to be formed when it is assumed that the upstream side inclination portion 41 of the inner pipe 4 is extended to the central axis A may not be in contact with the introduction pipe 54. This may be such that the upstream side inclination portion 41 of the inner pipe 4 and the introduction pipe 54 are formed so that the inner pipe extension face K intersects a surface L which is an extension of the introduction pipe 54 extended to its downstream side.

Figure 8:
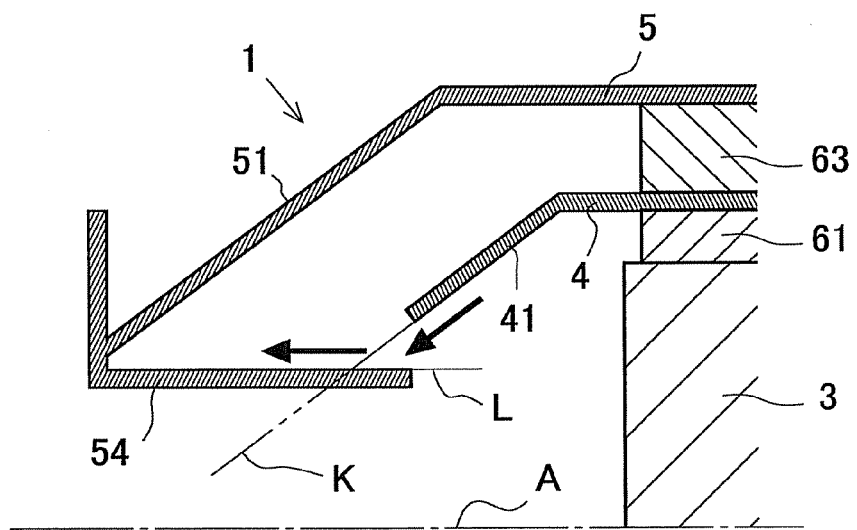
FIG. 8 is a view showing the schematic construction of an electrically heated catalyst in cases where an inner pipe extension surface K intersects an introduction pipe before it arrives at a central axis A.

Here, FIG. 8 is a view showing the schematic construction of an electrically heated catalyst 1 in cases where the inner pipe extension surface K intersects the introduction pipe 54 before it arrives at the central axis A. In the electrically heated catalyst 1 constructed in this manner, a part of the exhaust gas having flowed into the inner pipe 4 and rebounded from the catalyst carrier 3 goes along an inner peripheral surface of the upstream side inclination portion 41 of the inner pipe 4. This exhaust gas impinges against the outer peripheral surface of the introduction pipe 54, and goes to an upstream side along the outer peripheral surface of the introduction pipe 54. When this exhaust gas rebounds on the upstream side inclination portion 51 of the case 5, it will become liable to flow into between the inner pipe 4 and the case 5.

On the other hand, as shown in FIG. 7, in the electrically heated catalyst 1 according to this embodiment, the exhaust gas going along the inner peripheral surface of the upstream side inclination portion 41 of the inner pipe 4 goes toward the inside of the introduction pipe 54, without impinging against the outer peripheral surface of the introduction pipe 54. This exhaust gas is pushed by an exhaust gas freshly flowing into the case 5, so that it is forced to return to the downstream side. For this reason, it is possible to suppress the exhaust gas from flowing into between the inner pipe 4 and a case 5, thus making it possible to suppress particulate matter from adhering to between the inner pipe 4 and the case 5.

EXPLANATION OF REFERENCE NUMERALS AND CHARACTERS 1 electrically heated catalyst
2 exhaust pipe
3 catalyst carrier
4 inner pipe
5 case
6 mat
7 electrodes
8 insulation parts
41 upstream side inclination portion tubular portion
43 downstream side inclination portion
44 upstream side bent portion
45 downstream side bent portion
51 upstream side inclination portion
52 tubular portion
53 downstream side inclination portion
54 introduction pipe
61 inner mat
62 inner mat
63 outer mat
63A upstream side end portion
64 outer mat
64A downstream side end portion

The invention claimed is:
1. An electrically heated catalyst comprising:
a heat generation element that is electrically energized to generate heat;
a case that receives said heat generation element therein;
an inner pipe that is arranged between said heat generation element and said case for insulating electricity;
an inner mat that is arranged between said heat generation element and said inner pipe to insulate electricity and at the same time to support said heat generation element, said inner mat being shorter in a direction of flow of an exhaust gas than said inner pipe; and
an outer mat that is arranged between said inner pipe and said case to insulate electricity and at the same time to support said inner pipe, said outer mat being shorter in the direction of flow of the exhaust gas than said inner pipe;
wherein said inner pipe comprises a tubular portion that is arranged in the surrounding of said heat generation element, and is formed in parallel to a central axis of said heat generation element, and a downstream side inclination portion that is arranged at the downstream side of said tubular portion with an inside diameter thereof becoming smaller in a direction toward a downstream side;

a downstream side bent portion, being a boundary between said tubular portion and said downstream side inclination portion, is formed in the vicinity of a downstream side end portion of said outer mat, said inner pipe is provided with an upstream side inclination portion that is arranged at the upstream side of said tubular portion, with an inside diameter thereof becoming smaller in a direction toward an upstream side;

an upstream side bent portion, being a boundary between said tubular portion and said upstream side inclination portion, is formed separately from an upstream side end portion of said outer mat; and a heat transfer portion is provided which serves to connect said inner pipe and said heat generation element with each other thereby to transfer heat therebetween.

2. The electrically heated catalyst as set forth in claim 1, wherein said inner pipe is provided on a surface of an outer peripheral surface of said tubular portion with an insulating material which serves to insulate electricity, but no insulating material is provided on a surface of said upstream side inclination portion and on a surface of the inner peripheral surface of said tubular portion.

3. The electrically heated catalyst as set forth in claim 1, wherein an inside diameter of an upstream side end portion of said case is smaller than an inside diameter of an upstream side end portion of said inner pipe, and an inside diameter of a downstream side end portion of said case is larger than an inside diameter of a downstream side end portion of said inner pipe.

4. The electrically heated catalyst as set forth in claim 1, wherein said case has an introduction pipe extending from its upstream side end portion toward its downstream side, with an inside diameter of said introduction pipe being smaller than the inside diameter of the upstream side end portion of said inner pipe; and said introduction pipe has a downstream side end portion located at the upstream side of the upstream side end portion of said inner pipe; and an outside diameter of the downstream side end portion of said introduction pipe is larger than the inside diameter of the upstream side end portion of said inner pipe.

5. The electrically heated catalyst as set forth in claim 1, wherein said case has an introduction pipe extending from its upstream side end portion toward its downstream side, with an inside diameter of said introduction pipe being smaller than the inside diameter of the upstream side end portion of said inner pipe; and when assuming that the upstream side inclination portion of said inner pipe is extended to a central axis of said inner pipe, the upstream side inclination portion assumed to be extended does not intersect said introduction pipe.

* * * * *